United States Patent

Bates

[19]

[11] Patent Number: 6,057,779
[45] Date of Patent: May 2, 2000

[54] METHOD OF CONTROLLING ACCESS TO A MOVABLE CONTAINER AND TO A COMPARTMENT OF A VEHICLE, AND A SECURE CARGO TRANSPORTATION SYSTEM

[75] Inventor: Benjamin G. Bates, Boise, Id.

[73] Assignee: Micron Technology, Inc., Boise, Id.

[21] Appl. No.: 08/911,303

[22] Filed: Aug. 14, 1997

[51] Int. Cl.$^7$ .................................................. G06F 7/04
[52] U.S. Cl. .............................. 340/825.31; 340/825.32; 340/825.49; 340/825.54; 342/44
[58] Field of Search ........................ 340/825.31, 542, 340/994, 439, 825.32, 825.49, 825.54; 70/263; 235/382, 384; 701/29, 201, 202; 342/44

[56] References Cited

U.S. PATENT DOCUMENTS

| | | | |
|---|---|---|---|
| 4,075,632 | 2/1978 | Baldwin et al. | 343/6.8 |
| 4,401,971 | 8/1983 | Saito et al. | 340/519 |
| 4,926,182 | 5/1990 | Ohta et al. | 342/44 |
| 5,557,254 | 9/1996 | Johnson et al. | 340/426 |
| 5,621,412 | 4/1997 | Sharpe et al. | 342/51 |
| 5,649,296 | 7/1997 | MacLellan et al. | 455/38.2 |
| 5,682,139 | 10/1997 | Predeep et al. | 340/539 |
| 5,907,286 | 5/1999 | Kuma | 340/825.31 |

FOREIGN PATENT DOCUMENTS

451482 A1  10/1991  European Pat. Off. .

OTHER PUBLICATIONS

Intellikey Corporation Web Page, Mar. 3, 1997.
Tuttle, John R., "Digital RF/ID Enhances GPS," Proceedings of the Second Annual Wireless Symposium, Feb. 1994, pp. 406–411.

*Primary Examiner*—Michael Horabik
*Assistant Examiner*—Anthony A. Asongwed
*Attorney, Agent, or Firm*—Wells, St. John, Roberts, Gregory & Matkin, P.S.

[57] ABSTRACT

A method of controlling access to a movable container, the method comprising controllably locking the container using an electronically actuated locking mechanism; storing in a memory a desired geographical location; determining the geographical location of the container; and enabling the locking mechanism to unlock the container if the determined geographical location matches the desired geographical location. A secure cargo transportation system comprises a vehicle including an enclosure having an opening; a door movable relative to the opening between a closed position, wherein the door restricts access to the enclosure; and an open position; an electronically actuable lock configured to selectively lock or unlock the door relative to the enclosure; a memory supported by the vehicle and configured to store a location coordinate; and a global positioning system supported by the vehicle and coupled to the memory and to the lock, and configured to enable the lock to unlock the door if the vehicle is within a predetermined distance of the location coordinate.

33 Claims, 8 Drawing Sheets

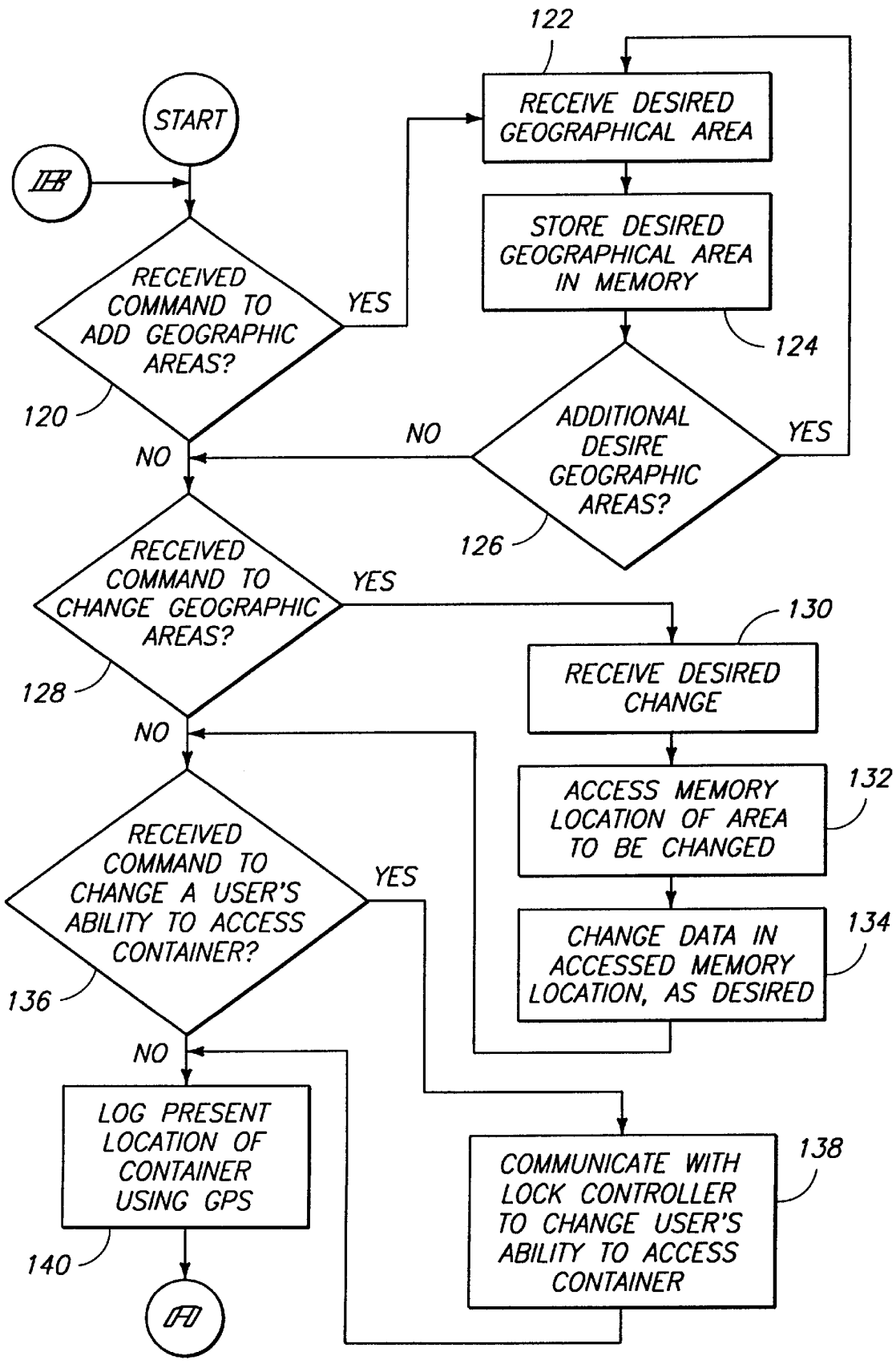

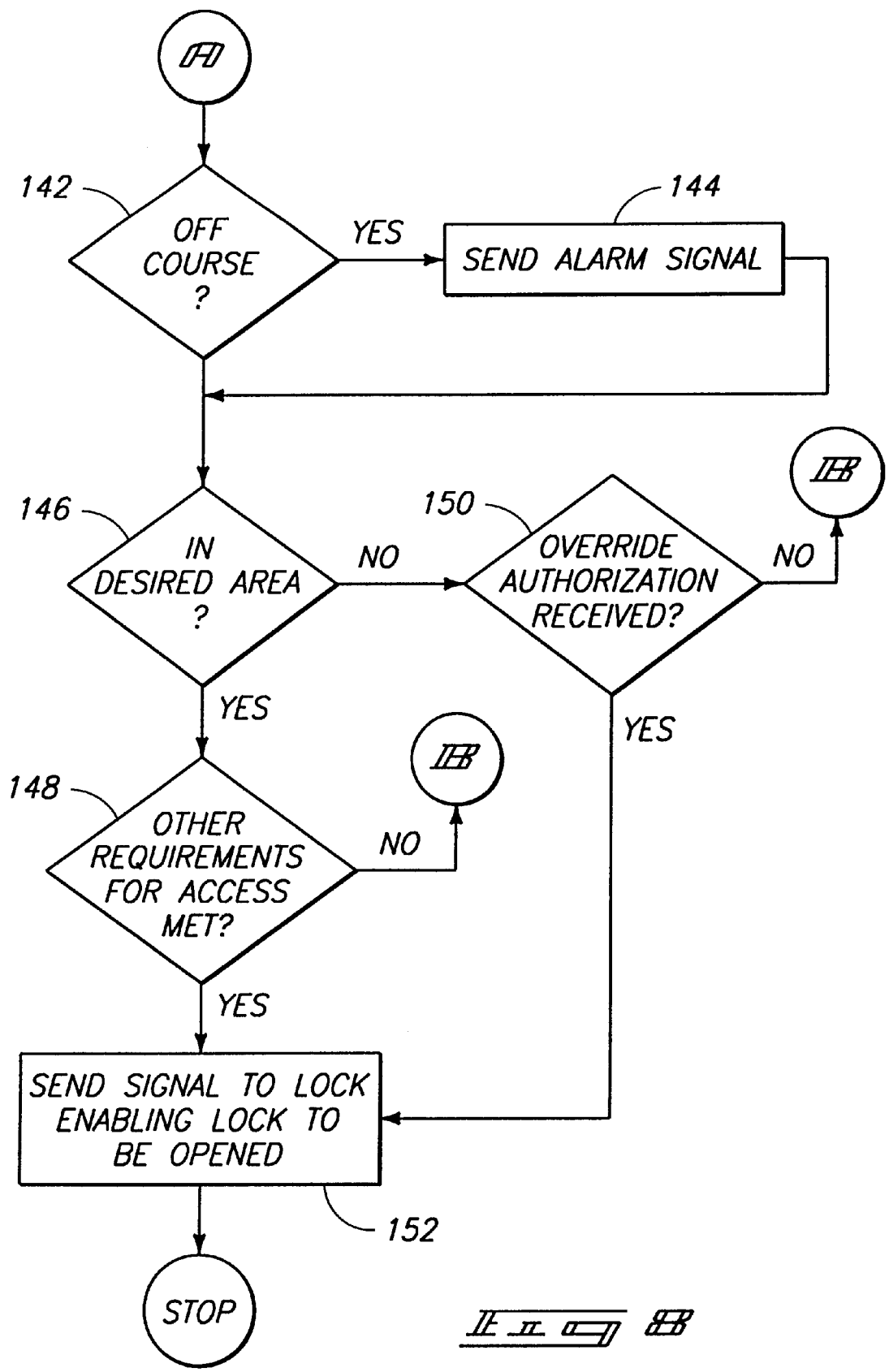

The invention provides a method and system for control-

METHOD OF CONTROLLING ACCESS TO A MOVABLE CONTAINER AND TO A COMPARTMENT OF A VEHICLE, AND A SECURE CARGO TRANSPORTATION SYSTEM

TECHNICAL FIELD

The invention relates to transportation systems. The invention also relates to security systems, lock systems, and access control.

BACKGROUND OF THE INVENTION

Valuable cargo is transported on a daily basis. It is desirable to secure the cargo against unauthorized access, so as to prevent tampering, theft of some cargo, or theft of all cargo.

Cargo is typically secured using conventional locks, such as padlocks, which are opened using a metal key. For example, for cargo transported by semi-trailers, the cargo is typically secured by locking the trailer door with a padlock. The driver then carries the key.

A problem with conventional methods of securing cargo is that the driver has access to the cargo and has the opportunity to steal some or all of the cargo. Further, there is the possibility of the driver being hijacked, and the key taken from the driver. There is also the possibility of the driver diverging from the intended course and taking the cargo to a non-approved area, such as to a competitor, to another state or country, or through an area where the risk of theft is greater.

SUMMARY OF THE INVENTION

The invention provides a method and system for controlling access to a movable container. The container is controllably locked using an electronically actuated locking mechanism. The locking mechanism is caused to unlock the container if a condition is met. The condition can be based on geographical location, date or time, or an override if the geographical location of the container cannot be determined. In one embodiment, a desired geographical location is stored in memory, the geographical location of the container is determined, and the locking mechanism is caused to unlock the container if the determined geographical location matches the desired geographical location.

In one aspect of the invention, the global positioning system is in communication with the memory and the locking mechanism.

In one aspect of the invention, the global positioning system communicates with the locking mechanism via radio frequency to cause the locking mechanism to unlock the container if the determined geographical location matches the desired geographical location. In another aspect of the invention, the global positioning system is electrically wired to the locking mechanism.

In one aspect of the invention, the desired geographical location is received via wireless communication, such as via microwave.

In one aspect of the invention, a global positioning system is used to determine the geographical location of the container. An area or geographical location can be defined by specifying a point and radius or a series of points and with an offset.

For example, in one aspect of the invention, storing in memory a desired geographical location comprises storing coordinates of at least three geographical points, and enabling the locking mechanism to unlock the container if the determined geographical location matches the desired geographical location comprises enabling the locking mechanism to unlock the container if the determined geographical location falls within an area defined by the coordinates.

In one aspect of the invention, storing in memory a desired geographical location comprises storing data representing a point, and storing data representing a radius, and enabling the locking mechanism to unlock the container if the determined geographical location matches the desired geographical location comprises enabling the locking mechanism to unlock the container if the determined geographical location falls within an area defined within a radius about the point corresponding to the stored radius.

In one aspect of the invention, the determination of the geographical location is repeated multiple times.

Another aspect of the invention provides a method and system for controlling access to a compartment of a vehicle. An electronically actuated locking mechanism is used for locking the compartment. A specified geographical area is received via wireless communications. The received geographical area is stored in memory. The geographical location of the vehicle is periodically determined using a global positioning system. Respective determined geographical locations are compared with the stored geographical area to ascertain whether the vehicle is within the stored geographical area, and the electronically actuated locking mechanism is caused to unlock the compartment if it is determined that the vehicle is within the stored geographical area.

Another aspect of the invention provides a method and system for controlling access to a movable container using an electronically actuated locking mechanism to lock the container. A plurality of geographical areas through which it is desired that the container travel are stored in memory. The geographical location of the container at each of a plurality of different times is logged, and the locking mechanism is caused to unlock the container if the container passed through each of the geographical areas stored in memory.

In one aspect of the invention, an order of geographical areas is defined, and the locking mechanism is caused to unlock the container if the container passed through each of the geographical areas in the defined order.

In one aspect of the invention, an order of geographical areas is defined, including a final destination geographical area, and the locking mechanism is enabled to unlock the container if the container passed through each of the geographical areas in the defined order and is in the final destination geographical area.

In another aspect of the invention, data defining a desired path of travel through which it is desired that the container travel is stored in memory. A geographical area defining a desired final destination is also stored in memory. An alert signal is produced if the vehicle deviates from the desired path of travel. In one aspect of the invention, data is stored defining a plurality of overlapping geographical areas.

Another aspect of the invention provides a secure cargo transportation system. The secure cargo transportation system comprises a vehicle including an enclosure having an opening. A door is movable relative to the opening between a closed position, wherein the door restricts access to the enclosure, and an open position. An electronically actuable lock is configured to selectively lock or unlock the door relative to the enclosure. A memory is supported by the vehicle and configured to store a location coordinate, and a global positioning system is supported by the vehicle and coupled to the memory and to the lock, and configured to enable the lock to unlock the door if the vehicle is within a predetermined distance of the location coordinate.

In one aspect of the invention, a remote intelligent communications device includes a global positioning system, is supported by a vehicle and is coupled to a lock. The wireless communications device includes a memory configured to store data representing a location, and the device enables the lock to unlock the door if the vehicle is within a predetermined distance of the location coordinate. The remote intelligent communications device is configured to receive the data via wireless communications.

In one aspect of the invention, the remote intelligent communications device is configured to receive data at microwave frequencies.

In one aspect of the invention, the remote intelligent communications device includes indicia for uniquely identifying the vehicle with respect to other vehicles.

BRIEF DESCRIPTION OF THE DRAWINGS

Preferred embodiments of the invention are described below with reference to the following accompanying drawings.

FIGS. 7 and 8 together define a flowchart illustrating operation of the secure cargo transportation system of FIG. 1.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
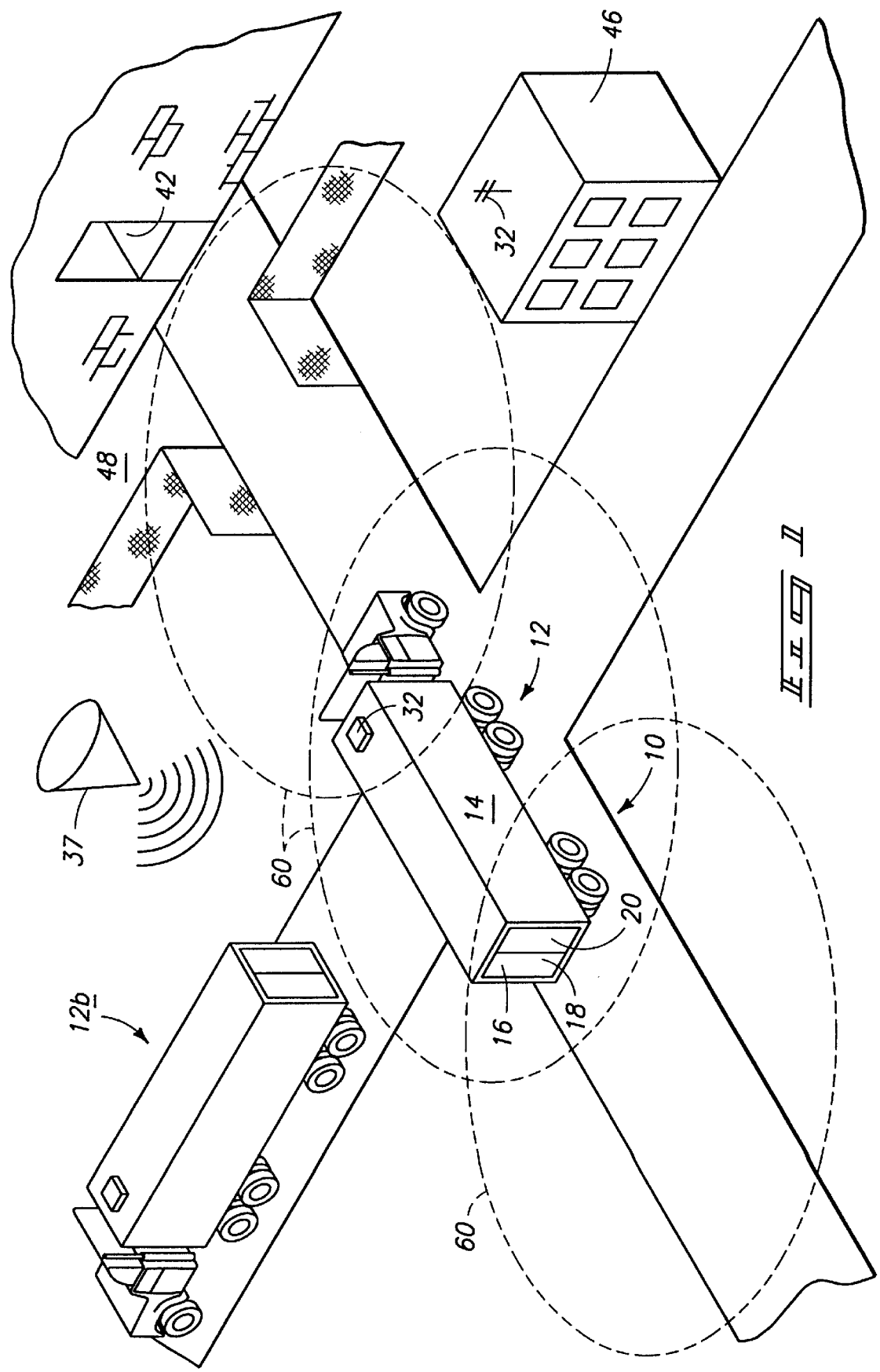
FIG. 1 is a perspective view illustrating a secure cargo transportation system and a method for controlling access to a movable container.
Figure 2:
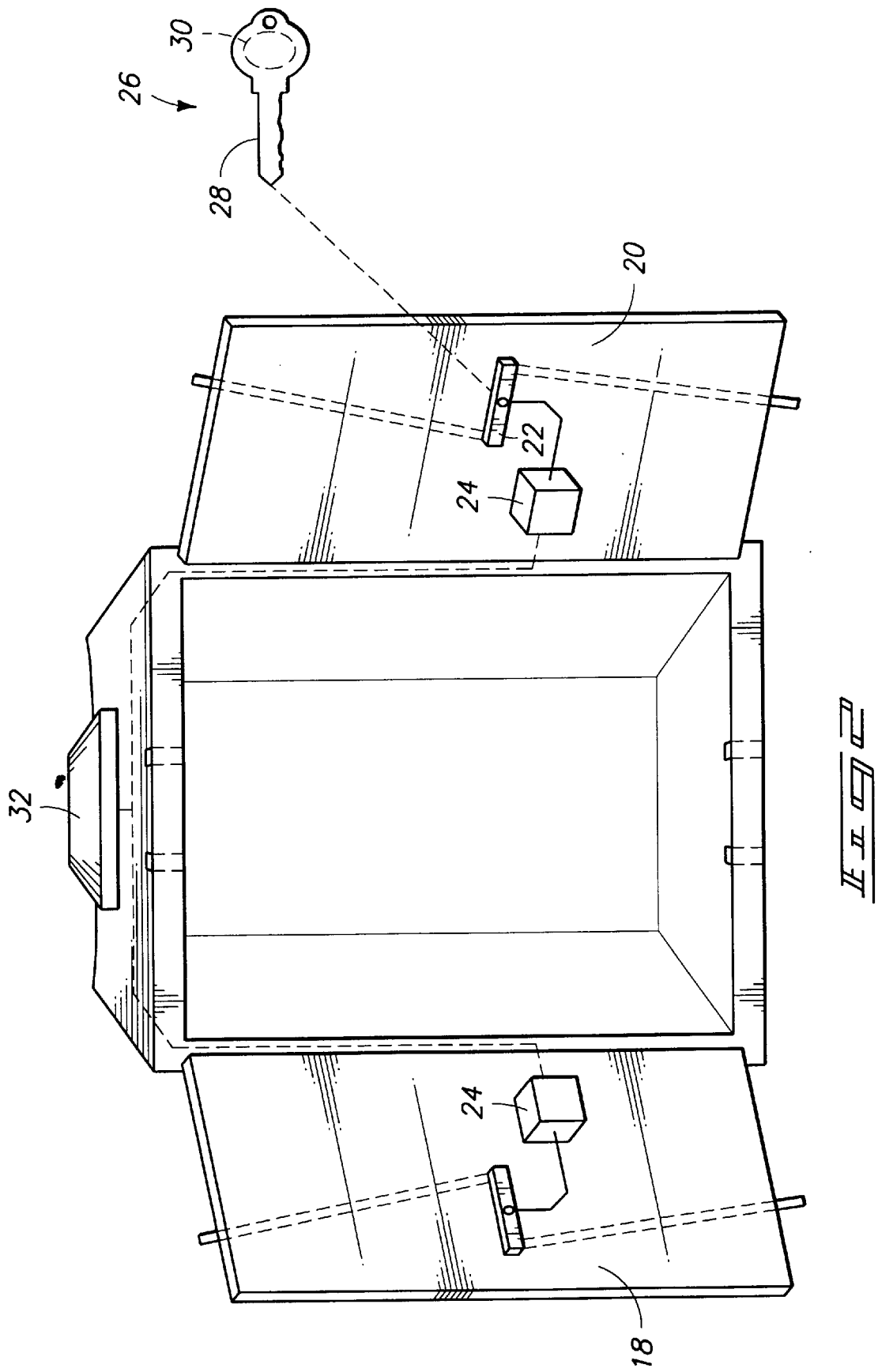
FIG. 2 is a diagrammatical perspective view illustrating a lock, controller, and key included in the system of FIG. 1.

FIG. 1 shows a secure cargo transportation system 10 embodying the invention. The secure cargo transportation system 10 comprises a movable container or vehicle 12 including an enclosure 14 having an opening 16. In the illustrated embodiment, the vehicle 12 is a semi trailer. In alternative embodiments, the movable container is defined by a train boxcar, a safe, a compartment in a boat or plane, or any other movable container. The vehicle 12 includes a door 18 movable relative to the opening 16 between a closed position, wherein the door 18 restricts access to the enclosure, and an open position (FIG. 2). In some embodiments, the vehicle includes multiple doors 18, 20. The vehicle 12 includes an electronically actuable lock 22 to selectively lock or unlock the door relative to the enclosure. In embodiments having two doors, the primary door is locked with an electronically enabled or actuable lock 22, or both doors are locked with an electronically enabled or actuable lock 22 such that access to the enclosure requires unlocking at least one electronically actuable lock 22.

More particularly, in the preferred embodiment, the doors 18 and 20 are fitted with an intelligent lock controller such as the lock controller sold by Intellikey Corporation, 551 S. Apollo Blvd., #204, Melbourne, Fla. 32901. In one embodiment, pre-existing mechanical cylinders can be replaced with electronic cylinders of the type sold by Intellikey, or the electronic cylinders can be installed initially. An electronic controller 24 is supported by the back of the door, inside the enclosure 14, or in other appropriate (preferably secure) location. In the illustrated embodiment, the lock 22 requires both an electronic key or signal and a mechanical key to open the lock. More particularly, a key 26 has a mechanical portion 28 as well as circuitry 30 supported therefrom (e.g., in the handle for the key) which communicates electronically with the lock (e.g., by radio frequency or magnetic coupling). In alternative embodiments, only an electronic key or signal is required to open the lock. Data communicated between the key and lock is encrypted, in the illustrated embodiment. In the illustrated embodiment, the key and lock provide multiple levels of access. For example, in the illustrated embodiment, seven masterkeying levels are available. The electronic controller 24 can be programmed to change whose key will open the lock and when. The circuitry 30 of the key 26 includes memory which carries access control information and identifying information for the user of the key. The controller 24 reads this information and determines whether the user of the key should be granted access. The controller 24 is programmable to grant access to the user of the key based on factors such as location and time. The memory of the circuitry 30 records an audit trail of in which lock the associated key 26 has been used. In addition to the electronic controller 24 being programmable, the circuitry 30 of the key 26 is also programmable, and access control and feature information can be changed for each key using a key programming unit available from Intellikey Corporation.

Figure 3:
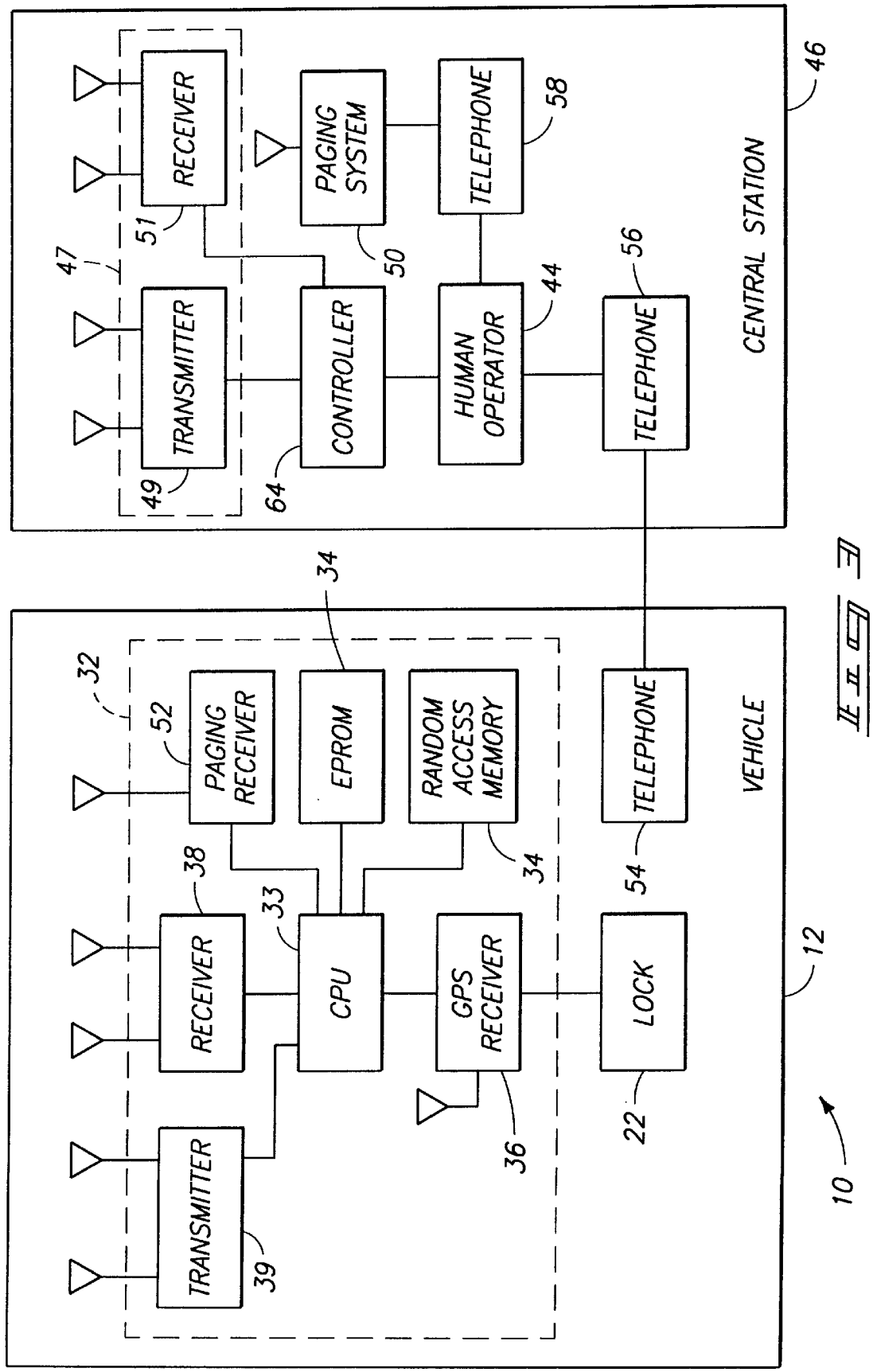
FIG. 3 is a block diagram illustrating the system of FIG. 1 in communication with a central communications station.

The system 10 further includes a remote intelligent communications device 32 (FIG. 3) supported by the vehicle 12 and in communication with the lock 22. More particularly, in the illustrated embodiment, the remote intelligent communications device 32 has an RS-232 port, and communicates with the lock controller 24 via a RS-232 cable connected between the RS-232 port of the device 32 and the lock controller 24. The remote intelligent communications device 32 includes a processor 33, a memory 34 coupled to the processor 33, and a global positioning system receiver 36 in communications with the processor 33, and thus with the memory 34. The global positioning system receiver 36 communicates with a global positioning satellite 37 to determine the position of the receiver 36. While other embodiments are possible, in the illustrated embodiment, the global positioning system receiver 36 is an Encore (TM) GPS receiver manufactured by or available from Motorola Inc., Schaumburg, Ill. The remote intelligent communications device 32 periodically or at various times logs in the memory 34 the position of the device 32 (and therefore the position of the vehicle 12) with respect to time. The remote intelligent communications device 32 uses UTC time obtained from GPS satellite data to provide time of day information for use with the logging of the position information.

An exemplary remote intelligent communications device 32 that can be employed is described in commonly assigned U.S. patent application Ser. No. 08/656,530, titled "A Method And Apparatus For Remote Monitoring," incorporated herein by reference. In the preferred embodiment, the remote intelligent communications device 32 is an Ambit (TM) remote intelligent communications device available from Micron Communications, Boise, Id. The Ambit (TM) device is a board level device which is similar in design and operation to an integrated circuit described in commonly assigned U.S. patent application Ser. No. 08/705,043, filed Aug. 29, 1996 and incorporated herein by reference, except that it further includes the global positioning system receiver.

The remote intelligent communications device 32 further includes a radio frequency (RF) communications receiver 38 coupled to the processor 33, which receives a desired location coordinate at which access to the contents of the enclosure 14 is permitted. The remote intelligent communications device 32 further includes a radio frequency (RF) communications transmitter 39 coupled to the processor 33. In the illustrated embodiment, the remote intelligent communications device receives and transmits data at microwave frequencies. The remote intelligent communications device includes indicia for uniquely identifying the vehicle 12 with respect to other vehicles 12. A central station 46 can communicate with a specified vehicle 12 out of a fleet of vehicles 12, 12b. More particularly, in the illustrated embodiment, multiple vehicles are equipped with the remote intelligent communications device 32 and lock 22, and the central station 46 can communicate with any desired vehicles to control access to enclosure 14 of a specified vehicle.

Desired access locations, such as docking bays 42 at final destinations are determined by a responsible person 44 at a central station 46 and communicated to the vehicle 12, such as by using a transmitter 49 (described below) located at or controlled at the central station 46.

When the vehicle 12 enters into a specified area, as determined by the GPS receiver 36, the remote intelligent communications device 32 sends a digital message to the controller 24 enabling the lock 22 to be opened with the key 26. The GPS area is defined so as to take into account the error possible with the GPS receiver 36 being used. The receiver 38 receives commands from the transmitter 49 when in communications range with a transmitter.

A desired or specified location 48 received by the receiver 38 is stored in memory. For example, the receiver receives a point and a radius, or three geographic points to define a desired area or location, or two points to define a line and an offset distance to the left and right of the line. In one embodiment, the processor 33 provides a signal to the controller 24 of the lock to enable unlocking using the key 26 if the vehicle 12 is within a predetermined distance of the desired location. Multiple locations can be specified where access is permitted. In another embodiment, the processor 33 provides for exception logic, enabling unlocking in all areas except a specified location 48.

Other methods of receiving and storing location coordinates can be employed. For example, some coordinates can be pre-programmed. For example, weigh stations at state lines have known coordinates which can be stored in memory so unlocking is enabled at these locations.

Further, new location coordinates where access is permitted can be communicated to the device 32 by a paging network or system 50. To this end, the device 32 further includes a paging receiver 52 coupled to the processor 33. Emergency access to the contents of the enclosure 14 can be granted by the operator 44 using the paging system. For example, if the vehicle is stopped by police who want to inspect cargo in the enclosure 14, the driver of the vehicle, using a telephone 54, can call a telephone 56 manned by the operator 44 at the central station 46. The operator 44 can then authorize access, regardless of the vehicle's location, using the same or a different telephone 58 to access the paging system 50. The telephone 54 used by the driver can be a cellular phone on board the vehicle, or a pay phone or other phone located outside the vehicle 12.

Alternatively, a cellular receiver can be employed instead of the paging receiver.

In one embodiment, a plurality of geographical areas 60 through which it is desired that the vehicle 12 travel are stored in memory 34. The geographical location of the container at each of a plurality of different times is logged, and the locking mechanism 22 is enabled to permit unlocking if the vehicle 12 passed through all of the geographical areas stored in memory 34.

In another embodiment of the invention, an order of geographical areas is defined, and the locking mechanism 22 is enabled to permit unlocking if the vehicle passed through the geographical areas in the defined order.

In another embodiment, an order of geographical areas is defined, including a final destination geographical area (e.g., area 48), and the locking mechanism 22 is enabled to unlock if the vehicle 12 passed through each of the geographical areas 60 in the defined order and is in the final destination geographical area.

In another embodiment of the invention, data defining a desired path of travel through which it is desired that the container travel is stored in memory 34. A geographical area defining a desired final destination (e.g., area 48) is also stored in memory 34. An alert signal is produced if the vehicle 12 deviates from the desired path of travel. In one aspect of the invention, data is stored defining a plurality of overlapping geographical areas. In one embodiment, the device 32 is coupled to the electrical system of the vehicle 12, or to an engine controller of the vehicle 12, and cuts off the engine if the vehicle deviates from the desired path of travel by more than a programmed amount. For example, the device 32 can be coupled to the engine controller in the manner disclosed in commonly assigned U.S. patent application Ser. No. 08/759,737, filed Dec. 6, 1996 and incorporated herein by reference.

As previously mentioned, the central station 46 includes the transmitter 49. More particularly, in the illustrated embodiment, the central station 46 includes an interrogator 47 comprising the transmitter 49, and further comprising a receiver 51. The remote intelligent communications device 32 transmits and receives radio frequency communications to and from the interrogator 47. The central station 46 further includes one or more send/receive antenna pairs 62 coupled to the interrogator 47. In an alternative embodiment, the interrogator 47 uses an antenna both for transmitting and receiving by the interrogator 47. The interrogator 47 includes transmitting and receiving circuitry, similar to that implemented in the remote intelligent communication device 32. In one embodiment, the system central station 46 further includes a controller 64. In the illustrated embodiment, the controller 64 is a computer. The controller 64 acts as a master in a master-slave relationship with the interrogator 47. The controller 64 includes an applications program for controlling the interrogator 47 and interpreting responses, and a library of radio frequency identification device applications or functions as described in the above-incorporated patent applications. Most of the functions communicate with the interrogator 47. These functions effect radio frequency communication between the interrogator 47 and the remote intelligent communications device 32. In one embodiment, the controller 64 and the interrogator 47 are combined together (e.g., in a common housing), or functions of the host computer are implemented in hard wired digital logic circuitry.

Generally, the interrogator 47 transmits an interrogation signal or command, such as a command to add geographical locations where opening of the lock 22 is enabled, ("forward link") via one of the antennas 62. The remote intelligent communications device 32 receives the incoming interrogation signal via its antenna, if it is within receiving range. Upon receiving the signal, the remote intelligent communications device 32 responds by generating and transmitting a responsive signal or reply ("return link"). The interrogator 47 is described in greater detail below.

In the illustrated embodiment, signals transmitted and received by the interrogator 47, and signals transmitted and received by the remote intelligent communications device 32 are modulated spread spectrum signals. Many modulation techniques minimize required transmission bandwidth. However, the spread spectrum modulation technique employed in the illustrated embodiment requires a transmission bandwidth that is up to several orders of magnitude greater than the minimum required signal bandwidth. Although spread spectrum modulation techniques are bandwidth inefficient in single user applications, they are advantageous where there are multiple users (e.g., multiple vehicles 12, 12*b*). The spread spectrum modulation technique of the illustrated embodiment is advantageous because the interrogator signal can be distinguished from other signals (e.g., radar, microwave ovens, etc.) operating at the same frequency. The spread spectrum signals transmitted by the device 32 and by the interrogator 47 are pseudo random and have noise-like properties. A spreading waveform is controlled by a pseudo-noise or pseudo random number (PN) sequence or code. The PN code is a binary sequence that appears random but can be reproduced in a predetermined manner by the device 32. More particularly, incoming spread spectrum received by the device 32 or interrogator 47 are demodulated through cross correlation with a version of the pseudo random carrier that is generated by the device 32 itself or the interrogator 47 itself, respectfully. Cross correlation with the correct PN sequence unspreads the spread spectrum signal and restores the modulated message in the same narrow band as the original data.

A pseudo-noise or pseudo random sequence (PN sequence) is a binary sequence with an autocorrelation that resembles, over a period, the autocorrelation of a random binary sequence. The autocorrelation of a pseudo-noise sequence also roughly resembles the autocorrelation of band-limited white noise. A pseudo-noise sequence has many characteristics that are similar to those of random binary sequences. For example, a pseudo-noise sequence has a nearly equal number of zeros and ones, very low correlation between shifted versions of the sequence, and very low cross correlation between any two sequences. A pseudo-noise sequence is usually generated using sequential logic circuits. For example, a pseudo-noise sequence can be generated using a feedback shift register.

A feedback shift register comprises consecutive stages of two state memory devices, and feedback logic. Binary sequences are shifted through the shift registers in response to clock pulses, and the output of the various stages are logically combined and fed back as the input to the first stage. The initial contents of the memory stages and the feedback logic circuit determine the successive contents of the memory.

The illustrated embodiment employs direct sequence spread spectrum modulation. A direct sequence spread spectrum (DSSS) system spreads the baseband data by directly multiplying the baseband data pulses with a pseudo-noise sequence that is produced by a pseudo-noise generator. A single pulse or symbol of the PN waveform is called a "chip." Synchronized data symbols, which may be information bits or binary channel code symbols, are added in modulo-2 fashion to the chips before being modulated. The receiver performs demodulation. For example, in one embodiment the data is phase modulated, and the receiver performs coherent or differentially coherent phase-shift keying (PSK) demodulation. In another embodiment, the data is amplitude modulated. Assuming that code synchronization has been achieved at the receiver, the received signal passes through a wideband filter and is multiplied by a local replica of the PN code sequence. This multiplication yields the unspread signal. A pseudo-noise sequence is usually an odd number of chips long.

Spread spectrum techniques are also disclosed in the following patent applications and patent, which are incorporated herein by reference: U.S. patent application Ser. No. 08/092,147; U.S. patent application Ser. No. 08/424,827, filed Apr. 19, 1995; and U.S. Pat. No. 5,121,407 to Partyka et al. They are also disclosed, for example, in "Spread Spectrum Systems," by R. C. Dixon, published by John Wiley and Sons, Inc.

In one embodiment, the interrogator 47 is coupled to the controller 64 via an IEEE-1284 enhanced parallel port (EPP).

In one embodiment, communications from the interrogator 47 to the device 32, and communications from the device 32 to the interrogator 47 use different physical protocols.

The physical communications protocol for communications from the interrogator 47 to the device 32 is referred to as the "forward link" protocol. In the illustrated embodiment, the forward link data is sent in the following order:

Preamble

Barker Code

Command Packet

Check Sum

A Maximal Length Pseudo Noise (PN) Sequence is used in the Direct Sequence Spread Spectrum (DSSS) communications scheme in the forward link. In one embodiment, the sequence is generated by a linear feedback shift register of a specified form. In the illustrated embodiment, there are multiple registers, the output of one of the registers is X-ORed with the output of another register, and the result is fed into the input of the first register. This produces a repeating 31 "chip" sequence. The sequence ends with all registers set to one. The sequence is taken from the output of the first register. This code is synchronous with the data in that each data bit comprises one and only one full PN sequence.

In one embodiment, a zero bit is transmitted as one inverted full cycle of the PN sequence. A one bit is transmitted as one full non-inverted cycle of the PN sequence.

The preamble precedes the data. In one embodiment, the preamble includes a series of zeros, followed by a start or Barker code.

In one embodiment, the Barker code is defined by the following bit string: 1111 1001 1010 1. Other embodiments are of course possible.

In the illustrated embodiment, command data is grouped into 13-bit words. Each word includes eight data bits (D7, D6, D5, D4, D3, D2, D1, DO) and five ECC (Error Correction Code) bits (P4, P3, P2, P1, and P0). In one embodiment, the bit transmission order is (with D7 transmitted first): D7, D6, D5, D4, D3, D2, D1, DO, P4, P3, P2, P1, PO.

In one embodiment, the ECC bits (P4–PO) are generated using the following equations:

PO=(D1+D2+D5+D7) modulo 2

P1=[(D1+D3+D4+D6) modulo 2] Complement

P2=(D0+D2+D3+D6+D7) modulo 2

P3=[(D0+D4+D5+D6+D7) modulo 2] Complement

P4=(DO+D1+D2+D3+D4+D5) modulo 2.

Other methods of generating the error correction code bits are of course possible.

In the illustrated embodiment, a 16-bit check sum is provided to detect bit errors on the packet level. The device 32 can be programmed to either return a reply if a bad check sum is found in the forward link, or to simply halt execution and send no replies. In one embodiment, a 16 bit CRC is employed in the forward link, the return link, or both, instead of or in addition to the check sum.

The physical communications protocol for communications from the device 32 to the interrogator 47 is referred to as the "return link" protocol. In the illustrated embodiment, the return link messages are sent in the following order:
Preamble,
Barker Code,
Reply Packet
Check Sum After sending a command, the interrogator 47 sends a continuous unmodulated RF signal with a specified frequency, such as 2.44 GHz, 915 MHz, or other frequencies. In the illustrated embodiment, return link data is Differential Phase Shift Key (DPSK) modulated onto a square wave subcarrier with a frequency of 596.1 kHz. A data 0 corresponds to one phase and data 1 corresponds to another, shifted 180 degrees from the first phase. For a simple dipole, a switch between the two halves of the dipole antenna is opened and closed. When the switch is closed, the antenna becomes the electrical equivalent of a single half-wavelength antenna that reflects a portion of the power being transmitted by the interrogator. When the switch is open, the antenna becomes the electrical equivalent of two quarter-wavelength antennas that reflect very little of the power transmitted by the interrogator.

The preamble for the return link includes 2000 bits, alternating 2 zeros then 2 ones, etc., and a 13-bit start (Barker) code. Alternative preambles are possible.

In the illustrated embodiment, the start code or Barker Code is defined by the following bit string: 1111 1001 1010 1.

The reply link data is grouped in 13 bit words. Each word is composed of 8 data bits (D7, D6, D5, D4, D3, D2, D1, DO) and 5 ECC bits (P4, P3, P2, P1, PO).

The Block Encoded Sequence is D7, D6, D5, D4, D3, D2, D1, DO, P4, P3, P2, P1, PO.

The Block ECC Bits (P4–PO) are generated using the following equations:

PO=(D1+D2+D5+D7) modulo 2

P1=[(D1+D3+D4+D6) modulo 2] Complement

P2=(D0+D2+D3+D6+D7) modulo 2

P3=[(DO+D4+D5+D6+D7) modulo 2] Complement

P4=(DO+D1+D2+D3+D4+D5) modulo 2.

Other methods of generating error correction code bits can, of course, be employed.

In the illustrated embodiment, a 16-bit check sum is provided to detect bit errors on the packet level. In one embodiment, a 16 bit CRC is employed in addition to or instead of the check sum.

Each pair of data words is interleaved, starting with the Barker code and the first data word. The transmitted bit order for two sequential words, A and B, is D7A, D7B, D6A, D6B, D5A, D5B, D4A, D4B, D3A, D3B, D2A, D2B, D1A, D1B, D0A, D0B, P4A, P4B, P3A, P3B, P2A, P2B, P1A, P1B, POA, POB.

D7A is the first transmitted bit. In the illustrated embodiment, DPSK is applied to the interleaved data.

Other communications protocols are of course possible for the forward link and return link.

Figure 4:
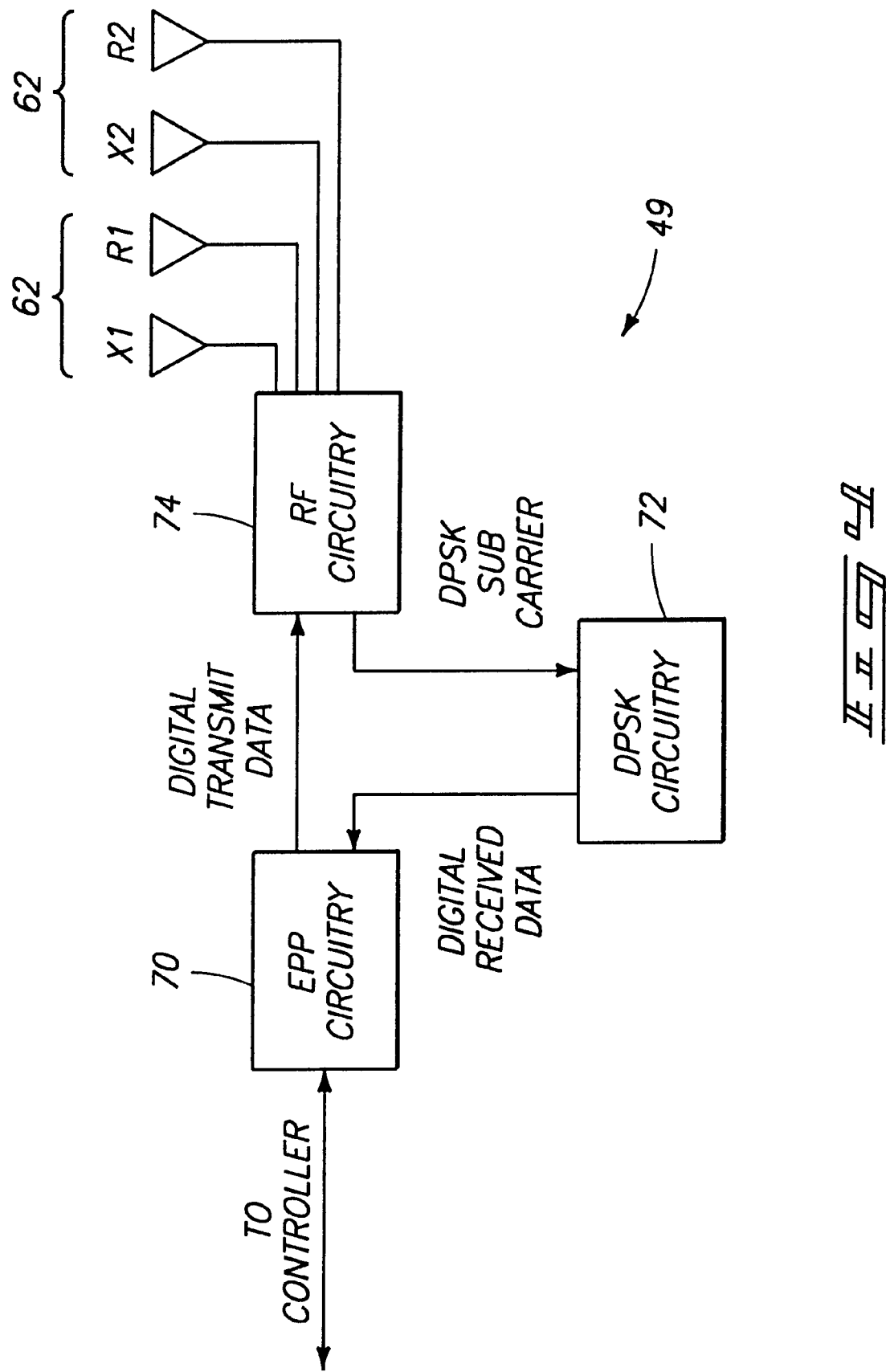
FIG. 4 is a block diagram of an interrogator or transmitter included in the central station of FIG. 3.

Details of construction of the interrogator 47 will now be provided, reference being made to FIG. 4. The interrogator 47 includes enhanced parallel port (EPP) circuitry 70, DPSK (differential phase shift keyed) circuitry 72, and RF (radio frequency) circuitry 74, as well as a power supply (not shown) and a housing or chassis (not shown). In the illustrated embodiment, the enhanced parallel port circuitry 70, the DPSK circuitry 72, and the RF circuitry 74 respectively define circuit card assemblies (CCAs). The interrogator 47 uses an IEEE-1284 compatible port in EPP mode to communicate with the controller 64. The EPP circuitry 70 provides all the digital logic required to coordinate sending and receiving a message to and from a remote intelligent communications device 32 of a vehicle 12. The EPP circuitry 70 buffers data to transmit from the controller 64, converts the data to serial data, and encodes it. The EPP circuitry 70 then waits for data from the device 32, converts it to parallel data, and transfers it to the controller 64. In one embodiment, messages include a programmable number of bytes of data.

The EPP mode interface provides an asynchronous, interlocked, byte wide, bi-directional channel controlled by the controller 64. The EPP mode allows the controller 64 to transfer, at high speed, a data byte to/from the interrogator within a single host computer CPU I/O cycle (typically 0.5 microseconds per byte).

Figure 5:
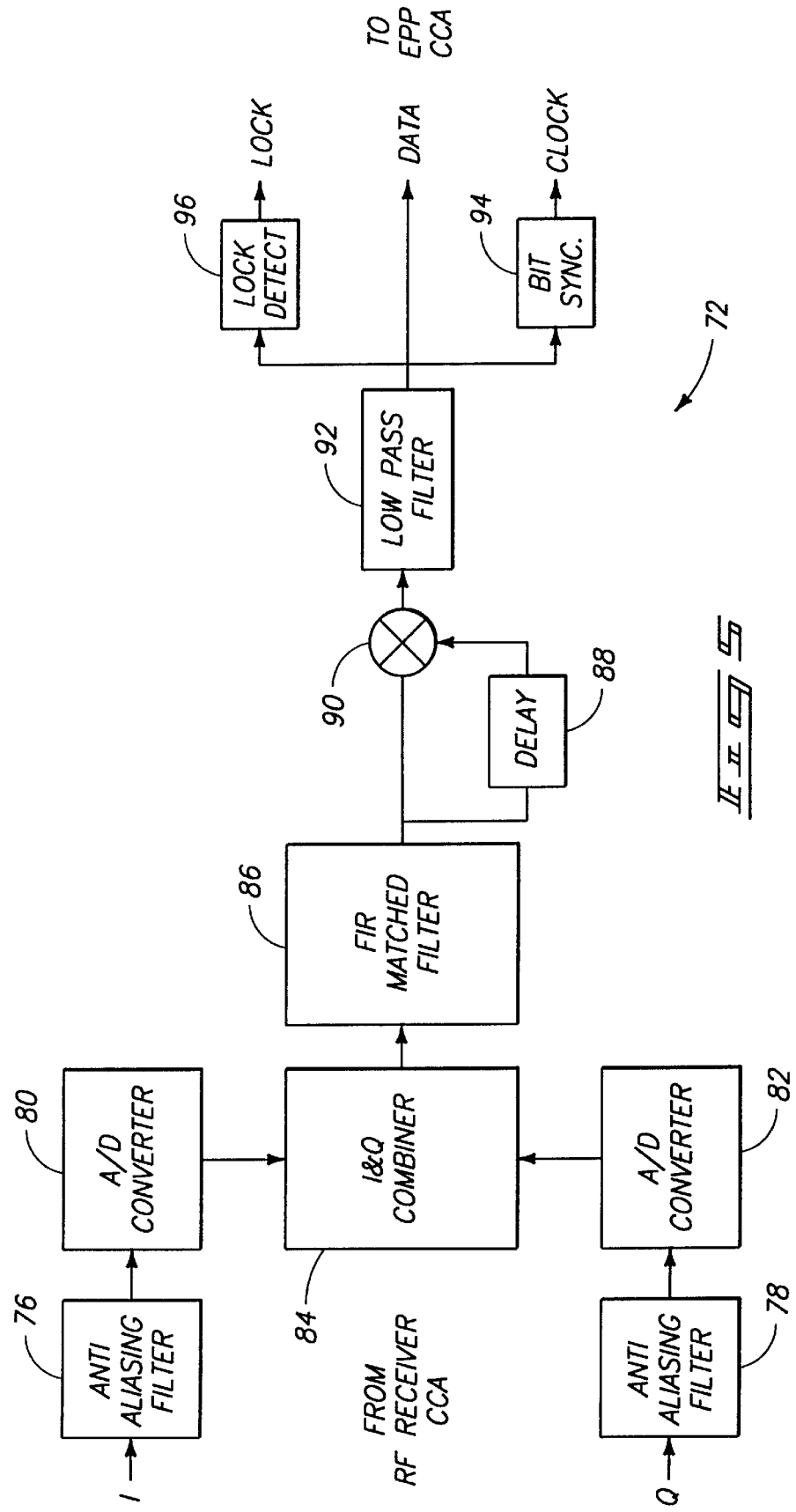
FIG. 5 is a block diagram showing details of DPSK circuitry included in the interrogator of FIG. 4.

The DPSK circuitry 72 (see FIG. 5) receives signals I and Q from the RF circuitry 74 (described below), which signals contain the DPSK modulated sub-carrier. The DPSK circuitry 72 includes anti-aliasing filters 76 and 78 filtering the I and Q signals, respectively, and analog to digital (A/D) converters 80 and 82 respectively coupled to the filters 76 and 78 and respectively converting the filtered signals from analog to digital signals. The DPSK circuitry 72 further includes a combiner 84, coupled to the A/D converters 80 and 82, combining the digital signals. The DPSK circuitry 72 further includes a FIR matched filter 86, coupled to the combiner 84, which filters the combined signals. The DPSK circuitry 72 further includes delay circuitry 88 and multiplier circuitry 90 coupled to the FIR matched filter 86 for delaying the signal and multiplying the signal with the delayed signal to remove the sub-carrier. The DPSK circuitry 72 further includes low pass filter circuitry 92, coupled to the multiplier 90, filtering the output of the multiplier 90 to remove the X2 component. The DPSK circuitry 72 further includes a bit synchronizer 94 coupled to the filter 92 for regeneration of the data clock. The DPSK circuitry 72 further includes lock detect circuitry 96 coupled to the low pass filter 92 and generating a lock detect signal. The data, clock, and lock detect signal are sent to the EPP circuitry 70.

Figure 6:
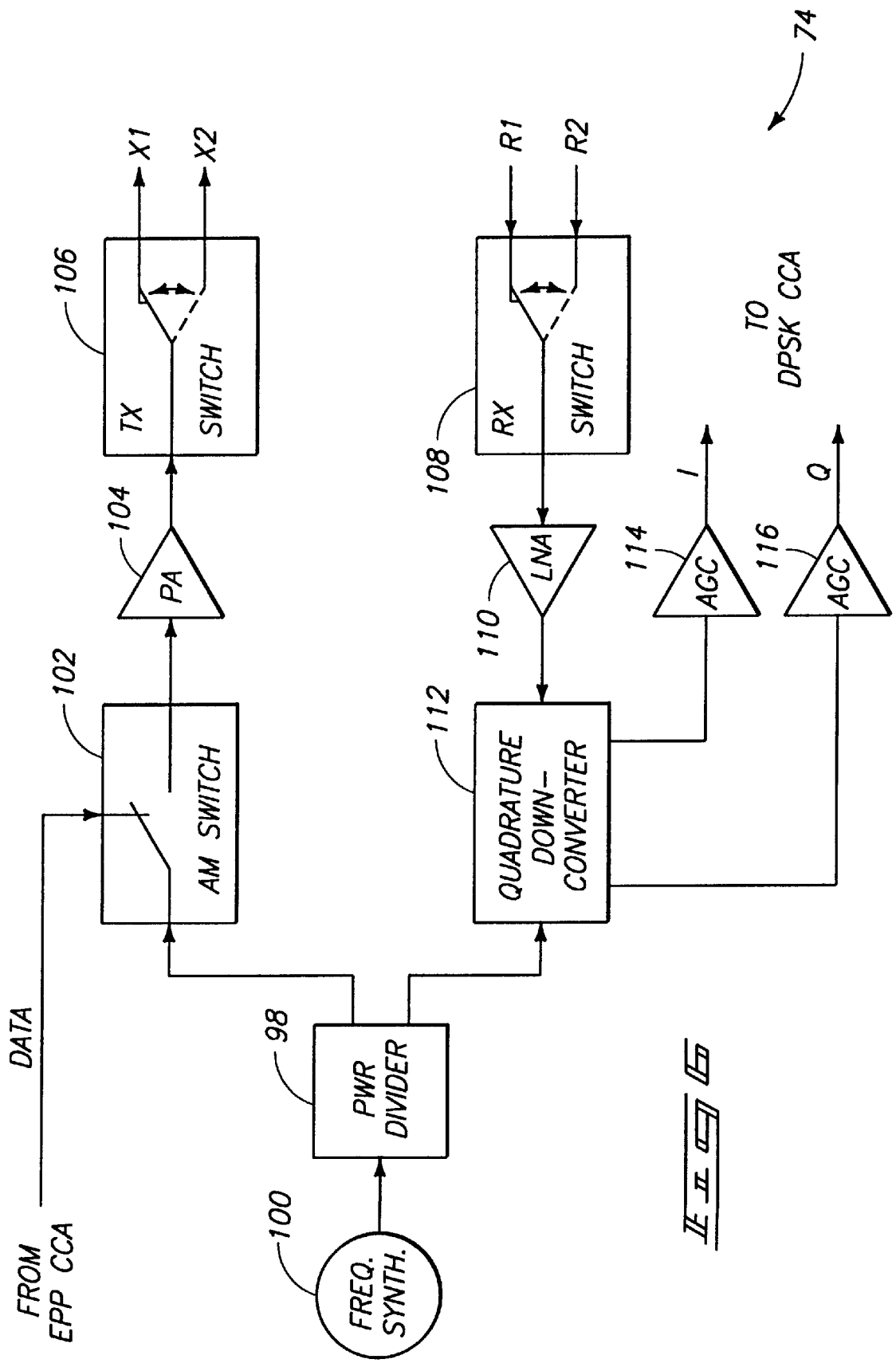
FIG. 6 is a block diagram showing details of RF circuitry included in the interrogator of FIG. 4.

The RF circuitry 74 (see FIG. 6) interfaces with the transmit and receive antennas 62. The RF circuitry modulates the data for transmission to a device 32 of a vehicle 12, provides a continuous wave (CW) carrier for backscatter communications with a device 32 (if backscatter communications are employed), and receives and downconverts the signal received from the transponder unit (which is a backscatter signal in one embodiment).

The RF circuitry 74 also includes a power divider 98, and a frequency synthesizer 100 coupled to the power divider 98. The frequency synthesizer 100 tunes the RF continuous waver carrier for frequency hopping and band selection. The RF circuitry defines a transmitter, and receives data from the EPP circuitry 70. The RF circuitry 74 includes an amplitude modulation (AM) switch 102 that receives the data from the EPP circuitry 70 and amplitude modulates the data onto a carrier. More particularly, the AM switch 102 turns the RF on and off (ON OFF KEY). The RF circuitry 74 further includes a power amplifier 104, coupled to the AM switch 102, to amplify the signal. The RF circuitry 74 further includes a switch 106, coupled to the power amplifier 104, for transmission of the amplified signal through a selected transmit antenna 62.

During continuous wave (CW) transmission for the backscatter mode, the AM switch 102 is left in a closed position. When the interrogator 50 is transmitting in the CW mode, the device 32 backscatters the signal with a DPSK modulated sub carrier. This signal is received via one of the receive antennas 62. More particularly, the RF circuitry 74 further includes a switch 108 coupled to the receive antennas. In another alternative embodiment, such as when backscatter communications are not employed, the RF circuitry uses common antennas for both transmission and reception. The RF circuitry 74 further includes a low noise amplifier (LNA) 110 coupled to the switch 108 and amplifying the received signal. The RF circuitry 74 further includes a quadrature downconverter 112, coupled to the LNA 110, coherently downconverting the received signal. The RF circuitry 74 further includes automatic gain controls (AGCs) 114 and 116 coupled to the quadrature down converter 112. The amplitude of the signals are set using the automatic gain controls 114 and 116 to provide the signals I and Q. The I and Q signals, which contain the DPSK modulated subcarrier, are passed on to the DPSK circuitry 72 (FIG. 5) for demodulation.

Although one interrogator 47 has been described, it may be desirable to provide multiple interrogators along a route, or interrogators at each of various facilities.

In one embodiment, communications between the central station 46 and a device 32 may be via the paging system 50 and paging receiver 52 or via the cellular system when the vehicle 12 is not within communications range of an interrogator 47.

FIGS. 7 and 8 together define a flowchart illustrating operation of the secure cargo transportation system.

In a step 120, a determination is made (e.g., by the processor 33 of the remote intelligent communications device 32) as to whether a command has been received (e.g., from an interrogator 47 or paging receiver 52) to add desired geographical areas. If so, the processor proceeds to step 122; if not, the processor proceeds to step 128.

In step 122, a desired geographical area (e.g., a point and a radius, or three or more points) is received by the device 32. After performing step 122, the processor proceeds to step 124.

In step 124, the desired geographical areas are stored in memory 34. After performing step 124, the processor proceeds to step 126.

In step 126, a determination is made as to whether there are additional desired geographical areas to be stored in memory. If so, the processor proceeds to step 122; if not, the processor proceeds to step 128.

In step 128, a determination is made as to whether a command has been received to change geographical areas. If so, the processor proceeds to step 130; if not, the processor proceeds to step 136.

In step 130, the desired change is received. After performing step 130, the processor proceeds to step 132.

In step 132, the processor accesses the memory location of the geographic area which is to be changed (or deleted). After performing step 132, the processor proceeds to step 134.

In step 134, the processor changes (or deletes) data in the accessed memory location, as desired. After performing step 134, the processor proceeds to step 136.

In step 136, a determination is made as to whether a command has been received to change a user's ability to access the container or vehicle 12. If so, the processor proceeds to step 138; if not, the processor proceeds to step 140.

In step 138, the device 32 communicates with the lock controller to change a user's ability to access the container. After performing step 138, the processor proceeds to step 140.

In step 140, the present location of the container is logged using the GPS receiver 36. After performing step 140, the processor proceeds to step 142.

In step 142, a determination is made as to whether the vehicle 12 or container is off course. If so, the processor proceeds to step 144; if not, the processor proceeds to step 146.

In step 144, an alarm signal is sent (e.g., an audible or visible alarm is sent to the driver and/or to the central station 46). After performing step 144, the processor proceeds to step 146.

In step 146, a determination is made as to whether the vehicle or container is in a desired geographical area (e.g., the desired final destination area). If so, the processor proceeds to step 148; if not, the processor proceeds to step 150.

In step 148, a determination is made as to whether other requirements for access are met (e.g., the vehicle or container is in the desired geographic area at a specified time; the vehicle passed through a specified sequence of desired areas; the holder of the key 26 is a person authorized to open the lock in this area and at this time; any other conditions imposed by the central station 46). After performing step 148, the processor proceeds to step 152.

In step 150, a determination is made as to whether an override authorization has been received from the central station 46 (e.g., the vehicle is not in the desired area, but there is an emergency situation). If so, the processor proceeds to step 152; if not, the processor proceeds to step 120 (possibly after a time delay).

In step 152, the device 32 sends a signal to the lock 22 enabling the lock to be opened (e.g., effecting unlocking, or permitting unlocking using the key 26).

Thus, a method of controlling access to a movable container is provided. As a mobile asset, such as a container, truck or some other thing travels, its movement is recorded into the memory of the device, with the location and movement being determined by GPS.

The location of the vehicle will be utilized to determine authorization keyed access to a truck. The keyed system, as tied into the GPS, would be such that opening would be authorized when the vehicle is within the confines of a specific location. Further, different parts of the vehicle or container may be subjected to different keyed openings, such that some enclosure of the vehicle can be opened at one location, but not others.

In one embodiment, the system is programmed in a "fail safe" manner, for example tieing the ultimate access to some specific route over which the vehicle is expected to travel. Therefore if the truck is hijacked or the driver deviates from a prescribed course, no opening whatsoever of the vehicle would be allowed, absent obtaining some authorization or some other code. In other words, the proximity within a desired route and ending locations can be programmed into the device.

In one embodiment, when the container, truck, etc. moves in the proximity of some general RF station, the data from the memory is downloaded or transmitted via RF to the base unit, such that the information is obtained and recorded remotely of the AMBIT unit on the vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of controlling access to a movable container by a processor coupled to the movable container, the method comprising:
    controllably locking the container using an electronically actuated locking mechanism in response to a command from the processor;
    storing in a memory a desired geographical location in response to a command from the processor;
    determining the geographical location of the container;
    comparing, in the processor, the geographical location of the container and the desired geographical location; and
    enabling the locking mechanism to unlock the container in response to the processor determining that the determined geographical location is within a predetermined distance from the desired geographical location.

2. A method in accordance with claim 1 wherein the step of determining the geographical location of the container comprises using a global positioning system.

3. A method in accordance with claim 2 wherein the global positioning system is movable with the container.

4. A method in accordance with claim 2 wherein the global positioning system is in communication with the memory and the locking mechanism.

5. A method in accordance with claim 2 wherein the global positioning system communicates with the locking mechanism via radio frequency to enable the locking mechanism to unlock the container if the determined geographical location matches the desired geographical location.

6. A method in accordance with claim 2 wherein the global positioning system is electrically wired to the locking mechanism.

7. A method in accordance with claim 1 and further comprising, before the storing step, the step of receiving the desired geographical location via wireless communication.

8. A method in accordance with claim 1 and further comprising, before the storing step, the step of receiving the desired geographical location via microwave.

9. A method in accordance with claim 1 and further comprising, before the storing step, the step of receiving the desired geographical location via radio frequency.

10. A method in accordance with claim 1 wherein the step of storing in a memory a desired geographical location comprises storing coordinates of at least three geographical points, and wherein the step of enabling the locking mechanism to unlock the container if the determined geographical location matches the desired geographical location comprises enabling the locking mechanism to unlock the container if the determined geographical location falls within an area defined by the coordinates.

11. A method in accordance with claim 1 wherein the step of storing in a memory a desired geographical location comprises storing data representing a point, and storing data representing a radius, and wherein the step of enabling the locking mechanism to unlock the container if the determined geographical location matches the desired geographical location comprises enabling the locking mechanism to unlock the container if the determined geographical location falls within an area defined within a radius about the point corresponding to the stored radius.

12. A method in accordance with claim 1 wherein the step of determining the geographical location is repeated multiple times.

13. A method in accordance with claim 1 wherein the step of determining the geographical location is repeated periodically.

14. A method of controlling access to a movable container, the method comprising:
    using an electronically actuated locking mechanism to lock the container;
    storing in memory a plurality of geographical areas through which it is desired that the container travel;
    logging the geographical location of the container at each of a plurality of different times; and
    enabling the locking mechanism to unlock the container if the container passed through each of the geographical areas stored in the storing step.

15. A method in accordance with claim 14 wherein the storing step further comprises defining an order of geographical areas, and wherein the step of enabling the locking mechanism to unlock the container comprises enabling the locking mechanism to unlock the container if the container passed through each of the geographical areas in the defined order.

16. A method in accordance with claim 14 wherein the storing step further comprises defining an order of geographical areas, including defining a final destination geographical area, and wherein the step of enabling the locking mechanism to unlock the container comprises enabling the locking mechanism to unlock the container if the container passed through each of the geographical areas in the defined order and is in the final destination geographical area.

17. A secure cargo transportation system comprising:
    a vehicle including an enclosure having an opening;
    a door movable relative to the opening between a closed position, wherein the door restricts access to the enclosure, and an open position;
    an electronically actuable lock configured to selectively lock or unlock the door relative to the enclosure;
    a memory supported by the vehicle and configured to store a location coordinate; and a global positioning system supported by the vehicle and coupled to the memory and to the lock, and configured to enable the lock to unlock the door if the vehicle is within a predetermined distance of the location coordinate.

18. A system in accordance with claim 17 and further comprising a wireless receiver supported by the vehicle and coupled to the memory and configured to transfer to the memory a location coordinate received from a remote transmitter.

19. A system in accordance with claim 17 wherein the electronically actuable lock is actuable in response to a digital key.

20. A system in accordance with claim 17 wherein the global positioning system includes the memory.

21. A system in accordance with claim 17 wherein the global positioning system communicates with the locking mechanism via radio frequency to enable the lock to unlock the door if the vehicle is within a predetermined distance of the location coordinate.

22. A system in accordance with claim 17 wherein the global positioning system is electrically hardwired to the locking mechanism.

23. A system in accordance with claim 17 and further comprising a microwave receiver supported by the vehicle and coupled to the memory and configured to transfer to the memory a location coordinate received via microwave from a microwave transmitter.

24. A system in accordance with claim 17 wherein the global positioning system comprises a processor configured to determine if the vehicle is within a predetermined distance of the location coordinate.

25. A secure cargo transportation system comprising:
   a vehicle including an enclosure having an opening;
   a door movable relative to the opening between a closed position, wherein the door restricts access to the enclosure, and an open position;
   a digitally actuable lock configured to selectively lock or unlock the door relative to the enclosure in response to a digital key;
   a global positioning system supported by the vehicle and coupled to the lock, the global positioning system including a memory configured to store a location coordinate, and the global positioning system being configured to enable the lock to unlock the door if the vehicle is within a predetermined distance of the location coordinate; and
   a wireless receiver supported by the vehicle and coupled to the memory and configured to transfer to the memory a location coordinate received from a transmitter.

26. A system in accordance with claim 25 wherein the global positioning system communicates with the locking mechanism via radio frequency to enable the lock to unlock the door if the vehicle is within a predetermined distance of the location coordinate.

27. A system in accordance with claim 25 wherein the global positioning system is hardwired to the locking mechanism.

28. A system in accordance with claim 25 wherein the receiver is a microwave receiver configured to receive data transmitted at microwave frequencies.

29. A system in accordance with claim 25 wherein the global positioning system comprises a processor configured to enable the lock to unlock the door if the vehicle is within a predetermined distance of the location coordinate.

30. A secure cargo transportation system comprising:
   a vehicle including an enclosure having an opening;
   a door movable relative to the opening between a closed position, wherein the door restricts access to the enclosure, and an open position;
   an electronically actuable lock configured to selectively lock or unlock the door relative to the enclosure; and
   a remote intelligent communications device, including a global positioning system, supported by the vehicle and coupled to the lock, the wireless communications device including a memory configured to store data representing a location, the device enabling the lock to unlock the door if the vehicle is within a predetermined distance of the location coordinate, the remote intelligent communications device being configured to receive the data via wireless communications.

31. A secure cargo transportation system in accordance with claim 30 wherein the remote intelligent communications device is configured to receive data at microwave frequencies.

32. A secure cargo transportation system in accordance with claim 30 wherein the enclosure is defined by a semi trailer.

33. A secure cargo transportation system in accordance with claim 30 wherein the remote intelligent communications device includes indicia for uniquely identifying the vehicle with respect to other vehicles.

* * * * *